(12) United States Patent
Kwon et al.

(10) Patent No.: US 9,721,359 B2
(45) Date of Patent: Aug. 1, 2017

(54) APPARATUS AND METHOD OF DECOMPRESSING RENDERING DATA AND RECORDING MEDIUM THEREOF

(71) Applicant: Samsung Electronics Co., Ltd., Suwon-si (KR)

(72) Inventors: Sunmin Kwon, Seoul (KR); Jeongae Park, Seoul (KR); Hoyoung Kim, Seoul (KR); Heejun Shim, Seoul (KR); Seonghoon Jeong, Yongin-si (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 0 days.

(21) Appl. No.: 14/667,780

(22) Filed: Mar. 25, 2015

(65) Prior Publication Data

US 2016/0078665 A1 Mar. 17, 2016

(30) Foreign Application Priority Data

Sep. 17, 2014 (KR) .................. 10-2014-0123706

(51) Int. Cl.
*G06T 9/00* (2006.01)
(52) U.S. Cl.
CPC ...................................... *G06T 9/00* (2013.01)
(58) Field of Classification Search
CPC ....... G06T 11/001; G06T 11/40; G06T 15/04; H04N 1/41; H04N 19/00; H04N 19/42; H04N 19/46; H04N 19/463
USPC ......... 345/552, 582, 583; 382/232, 233, 304
See application file for complete search history.

(56) References Cited

U.S. PATENT DOCUMENTS

| | | | |
|---|---|---|---|
| 6,157,743 A * | 12/2000 | Goris | G06T 1/60 345/501 |
| 6,339,428 B1 | 1/2002 | Fowler et al. | |
| 6,959,110 B1 | 10/2005 | Danskin et al. | |
| 7,760,936 B1 | 7/2010 | King et al. | |
| 9,055,120 B1 * | 6/2015 | Firman | G06F 8/60 |
| 2008/0002896 A1 | 1/2008 | Lu et al. | |
| 2009/0160857 A1 * | 6/2009 | Rasmusson | G06T 15/04 345/422 |
| 2009/0315905 A1 | 12/2009 | Lu et al. | |
| 2011/0074765 A1 * | 3/2011 | Oterhals | G06T 11/40 345/418 |
| 2011/0157196 A1 * | 6/2011 | Nave | A63F 13/12 345/522 |
| 2012/0069036 A1 * | 3/2012 | Dharmapurikar | G06F 3/14 345/582 |
| 2012/0219233 A1 * | 8/2012 | Uro | G06T 9/00 382/239 |
| 2013/0208795 A1 | 8/2013 | Xu et al. | |

(Continued)

*Primary Examiner* — Ulka Chauhan
*Assistant Examiner* — Sae Won Yoon
(74) *Attorney, Agent, or Firm* — F. Chau & Associates, LLC

(57) ABSTRACT

Provided is a decompression apparatus and method thereof for decompressing rendering data. The decompression apparatus includes a data parsing unit configured to acquire a control component and a texture component from compressed input data including rendering information of an object, a decompression controller configured to allocate the control component to a control unit, wherein the control unit extracts a control command from the control component, and a logic calculation unit configured to, based on the control command, restore texture data of the object from the texture component.

15 Claims, 9 Drawing Sheets

(56) References Cited

U.S. PATENT DOCUMENTS

| | | | |
|---|---|---|---|
| 2014/0193081 A1* | 7/2014 | Nystad | H04N 19/90 382/197 |
| 2014/0198846 A1* | 7/2014 | Guo | H04N 19/30 375/240.12 |
| 2015/0278981 A1* | 10/2015 | Akenine-Moller | G06T 1/20 345/522 |

* cited by examiner

APPARATUS AND METHOD OF DECOMPRESSING RENDERING DATA AND RECORDING MEDIUM THEREOF

CROSS-REFERENCE TO RELATED APPLICATION(S)

This application claims the benefit under 35 U.S.C. §119(a) of Korean Patent Application No. 10-2014-0123706, filed on Sep. 17, 2014, in the Korean Intellectual Property Office, the disclosure of which is incorporated herein in its entirety by reference.

BACKGROUND

1. Field

The following description relates to apparatuses for decompressing rendering data, methods of decompressing rendering data, and non-transitory computer-readable recording media having embodied thereon a program for executing the methods.

2. Description of Related Art

To provide a user with a 3-dimensional (3D) graphic, a mobile device or other similar electronic device may perform rendering using 3D graphic data. The available electronic devices to which user interface (UI) applications and simulating applications are applied are expanding.

As an application range of graphics data expands, an amount of graphics data that has to be processed by a device to accurately render 3D graphic data also increase. Therefore, an amount of memory and processing time required to execute an application processing graphics data has increased because a calculation amount increases when the device performs a rendering operation of graphics data.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In accordance with an illustrative example, there is provided a decompression apparatus for decompressing rendering data, including a data parsing unit configured to acquire a control component and a texture component from compressed input data including rendering information of an object; a decompression controller configured to allocate the control component to a control unit, wherein the control unit extracts a control command from the control component; and a logic calculation unit configured to, based on the control command, restore texture data of the object from the texture component.

The decompression controller may include control units, each configured to process a compression format of the compressed input data, and is further configured to allocate the control component to the control unit of the control units corresponding to the compression format of the compressed input data.

The decompression controller may include control units of a same type, which are identified according to identifiers, and is further configured to determine a type and an identifier of the control unit to which the control component is allocated.

The decompression apparatus may also include a data buffer configured to store the control component and the texture data.

The decompression controller may be further configured to compare previously acquired first control component and first texture component with currently acquired second control component and second texture component, in response to the first control component and the first texture component being different from the second control component and the second texture component, respectively, the decompression controller may be further configured to determine second texture data that is restored from the second control component as output data, and in response to the first control component and the first texture component being the same as the second control component and the second texture component, respectively, the decompression controller may be further configured to determine first texture data restored from the first texture component as output data.

The decompression controller may be further configured to compare a previously acquired first control component with a currently acquired second control component, in response to the first control component and the second control component being different from each other, the decompression controller may be further configured to control the logic calculation unit to restore second texture data from a second texture component corresponding to the second control component according to the control command extracted from the second control component, and in response to the first control component and the second control component being the same as each other, the decompression controller may be further configured to select first texture data corresponding to the first control component.

The data parsing unit may be further configured to acquire control components and texture components, and the decompression controller may be further configured to allocate the control components to control units respectively corresponding to the control components and transmits control commands acquired from the control units to the logic calculation unit.

The logic calculation unit may include calculation units, and is configured to allocate the texture components, respectively, to the calculation units based on the control commands to restore pieces of texture data in parallel.

The data parsing unit may be configured to process the compressed input data by parsing the input data to control components and texture components, and the decompression controller may include control units, and the control components having different compression formats are processed by corresponding control units and texture components are processed by a control unit of the control units.

In accordance with another illustrative example, there is provided a method of decompressing rendering data, including acquiring a control component and a texture component from compressed input data including rendering information of an object at a decompression apparatus; allocating the control component to a control unit included in the decompression apparatus; extracting a control command from the control component; and restoring texture data of the object from the texture component based on the control command.

The allocating of the control component may include allocating the control component to the control unit corresponding to a compression format of the compressed input data, from among control units, each configured to process a compression format of the compressed input data.

The allocating of the control component may include determining a type and an identifier the control unit, and further including identifying control units of a same type using identifiers.

The method may also include storing the control component and the texture data in a data buffer.

The method may also include comparing previously acquired first control component and first texture component with currently acquired second control component and second texture component; in response to the first control component and the first texture component being different from the second control component and the second texture component, respectively, determining second texture data restored from the second control component as output data; and in response to the first control component and the first texture component being the same as the second control component and the second texture component, respectively, determining first texture data restored from the first texture component as output data.

The method may also include comparing the first control component with the second control component; in response to the first control component and the second control component being different from each other, restoring second texture data from the second texture component corresponding to the second control component according to the control command extracted from the second control component; and in response to the first control component and the second control component being the same as each other, selecting the first texture data corresponding to the first control component that is previously stored.

The acquiring of the control component and the texture component may include acquiring control components and texture components, and the allocating of the control component may include allocating the control components to the control units respectively corresponding to the control components; and transmitting control commands acquired from the control units to the logic calculation unit.

The allocating of the texture component may include allocating the texture components to the calculation units, respectively, included in the logic calculation unit based on the control commands, and the restoring of the texture data may be performed to restore pieces of the texture data in parallel.

The method may include allocating the texture component to a logic calculation device included in the decompression apparatus.

The method may include processing the compressed input data by parsing the input data to control components and texture components; processing the control components having different compression formats by corresponding control units of the decompression apparatus; and processing texture components by a control unit of the control units.

In accordance with another illustrative example, there is provided a computer program embodied on a non-transitory computer readable medium, the computer program being configured to control a processor to perform the method described above.

Other features and aspects may be apparent from the following detailed description, the drawings, and the claims.

BRIEF DESCRIPTION OF THE DRAWINGS

These and/or other aspects will become apparent and more readily appreciated from the following description of the exemplary embodiments, taken in conjunction with the accompanying drawings in which.

Figure 1:
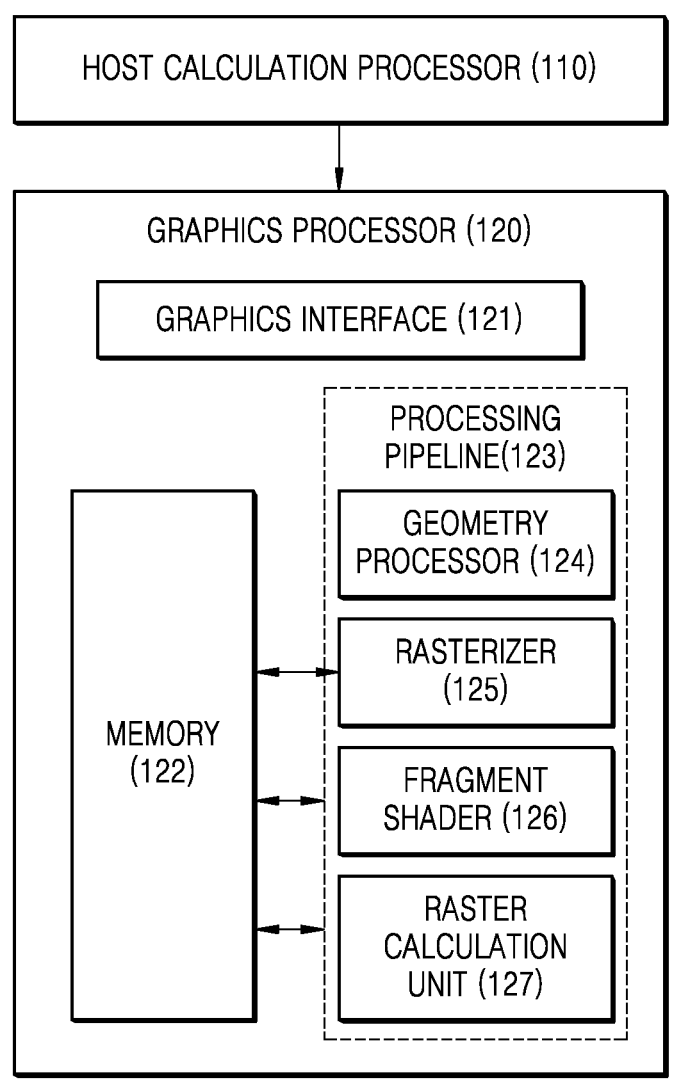
FIG. 1 is a block diagram of a rendering system of graphics data to decompress rendering data, according to an embodiment.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

It will be understood that when an element is referred to as being "connected to" or "coupled to" another element, it may be "directly connected or coupled" to the other element, or "electrically connected to" the other element with intervening elements therebetween. It will be further understood that the terms "comprises", "comprising", "includes", and/or "including" when used herein, specify the presence of components, but do not preclude the presence or addition of one or more other components, unless otherwise specified. As used herein, the term "and/or" includes any and all combinations of one or more of the associated listed items. Expressions such as "at least one of," when preceding a list of elements, modify the entire list of elements and do not modify the individual elements of the list.

Hereinafter, various embodiments of the inventive concept will be described with reference to accompanying drawings.

FIG. 1 is a block diagram of a rendering system of graphics data 100 (hereinafter, referred to as a rendering system 100) to decompress rendering data, according to an embodiment.

The rendering system 100 shown in FIG. 1 includes structural elements including a host calculation processor 110 and a graphics processor 120. However, the configuration of the rendering system 100 may vary, for instance, although the host calculation processor 110 and the graphics processor 120 are illustrated as separate structural elements, in an alternative embodiment, both elements may be integrally formed.

In addition, for illustrative purposes, the graphics processor 120 includes a graphics interface 121, a memory 122, a geometry processor 124, a rasterizer 125, a fragment shader 126, and a raster calculation unit 127. In an alternative configuration, although all of these structural elements are illustrated as an integral part of the graphics processor 120, one or more of these structural elements may be external to the graphics processor 120. Also, additional structural elements other than the elements shown in FIG. 1 may be further included in the rendering system 100.

Referring to FIG. 1, the rendering system 100 includes the host calculation processor 110 and the graphics processor 120 to decompress rendering data, according to an embodiment. The rendering system 100 includes, but it is not limited to, a desk top computer, a server, a laptop computer, a tablet computer, a game console, and a portable terminal, such as a personal digital assistant (PDA) or a cellular phone.

The host calculation processor 110 performs processes and calculations to execute graphics applications, such as a user interface (UI) application and a simulation application. In one illustrative example, the graphics application is an application that requires images to be rendered. For example, game applications and video applications are graphics applications. The host calculation processor 110 generates a high-level command in order to process rendering data when executing the graphics application. The rendering data includes texture information of objects included in an image or a video that is to be rendered. Texture is mapped to the surface of a simpler graphical object to give the appearance of fine details. 3D video games, for example, use texture maps to improve the realism and the visual detail of graphical objects.

The graphics processor 120 communicates with the host calculation processor 110. The host calculation processor 110 transmits to the graphics processor 120 a high-level command. In response, the graphics processor 120 renders the image or the video of an application that is executed by the host calculation processor 110. The graphics processor 120 transmits the rendered image or video to the host calculation processor 110.

Referring to FIG. 1, the graphics processor 120 includes the graphics interface 121, the memory 122, and a graphics processing pipeline 123.

The graphics interface 121 receives the high-level command from the host calculation processor 110, and transfers the high-level command to the memory 122 and the graphics processing pipeline 123. In one configuration, the graphics interface 121 transfers simultaneously or sequentially the high-level command to the memory 122 and the graphics processing pipeline 123.

The memory 122 stores the high-level command transmitted from the graphics interface 121 and stores rendering data needed to perform a rendering operation in the graphics processing pipeline 123.

The graphics processing pipeline 123 renders an image or a video, and outputs the rendered image or video. The graphics processing pipeline 123 includes the geometry processor 124, the rasterizer 125, the fragment shader 126, and the raster calculation unit 127.

The geometry processor 124 receives data according to an application-specific data structure, and generates vertexes based on the data. The geometry processor 124 converts 3D locations of the vertexes in a virtual space into 2D coordinates and depth values of Z-buffer that will be displayed on a screen. The geometry processor 124 generates an executable primitive, for example, a line, a point, and a triangle, based on vertex data.

The rasterizer 125 interpolates screen coordinates and text coordinates defined for each vertex in the primitive transmitted from the geometry processor 124 to generate fragment information about the primitive. In following embodiments, the terminologies 'fragment' and 'pixel' have the same meaning and may be interchangeably used.

The fragment shader 126 calculates texture mapping and light reflection with respect to each fragment to determine a color and a texture of the fragment. For example, the fragment shader 126 determines the texture of each fragment based on compressed input data acquired from the memory 122. The fragment shader 126, according to an embodiment, parses at least one piece of input data that is compressed, according to various compression formats, to a control component and a texture component to process the input data. Because the fragment shader 126 processes the compressed input data by parsing the input data to the control component and the texture component, control components having different compression formats are processed by corresponding units and texture components are processed by one unit, thereby improving rendering efficiency. This will be described in more detail later. A frame buffer 170 is a video output device to drive video output from the memory 122 including a complete data frame.

The raster calculation unit 127 outputs the fragment based on the determined color and texture of the fragment. The memory 122 stores information of the fragment, to which the determined color and texture are applied.

Figure 2:
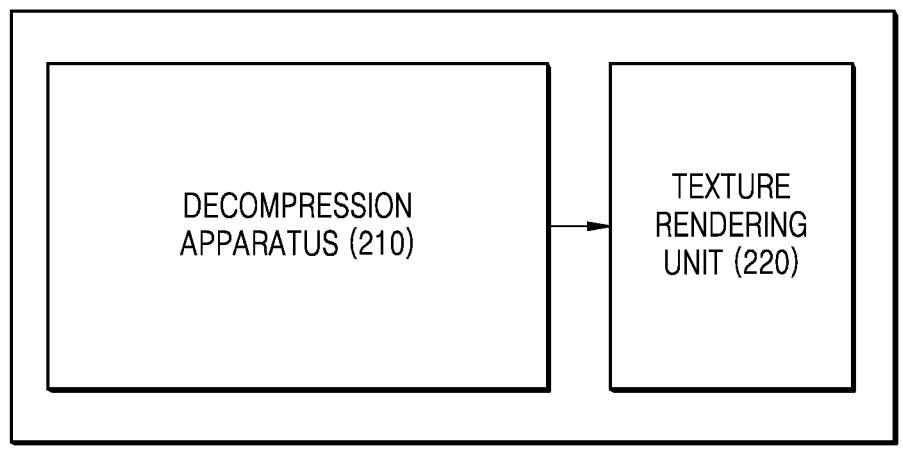
FIG. 2 is a block diagram of a fragment shader acquiring texture data by decompressing rendering data, according to an embodiment.

FIG. 2 is a block diagram of the fragment shader 126 that acquires texture data by decompressing the rendering data, according to an embodiment.

Referring to FIG. 2, the fragment shader 126 includes an apparatus to decompress the rendering data 210 (hereinafter, referred to as a decompression apparatus 210) and a texture rendering unit 220. Although FIG. 2 illustrates the fragment shader 126 including the decompression apparatus 210 and the texture rendering unit 220, additional structural elements may be included in the fragment shader 126. Therefore, universal elements other than the elements shown in FIG. 2 may be further included in the fragment shader 126.

The decompression apparatus 210 acquires compressed input data from the memory 122 (see FIG. 1). In one example, the compressed input data includes rendering data used to determine the texture of the fragment. Hereinafter, texture data will be described below as an example of the rendering data, for convenience of description.

In addition, the compressed input data includes the control component and the texture component that are necessary when the compressed input data is decompressed to acquire the texture data. The control component includes information about the compression format. In one example, the information included in the control component varies depending on the compression format that is used to compress the texture data. The texture component includes information about logic calculations that are to be performed to acquire the texture data from the compressed input data. The texture component includes operator information and calculation data used in the logic calculation that is commonly required by various compression formats. The control component and the texture component will be described in more detail below with reference to FIG. 3.

The decompression apparatus 210, according to an embodiment, parses the input data to acquire the control component and the texture component. The decompression apparatus 210 isolates the control component that varies depending on the compression format and the texture component, which are commonly processed irrespective of the compression formation of each other. The decompression apparatus 210 processes the texture component in one module to effectively use a resource that is necessary in the rendering operation.

The texture rendering unit 220 calculates the texture mapping and the light reflection, with respect to each fragment, based on the texture data that is obtained by decompressing the compressed input data, and determines the texture of the fragment. The texture rendering unit 220 determines the texture of the fragment based on the texture data by using texture rendering methods, including direct volume rendering methods and haptic texture rendering methods.

Figure 3:
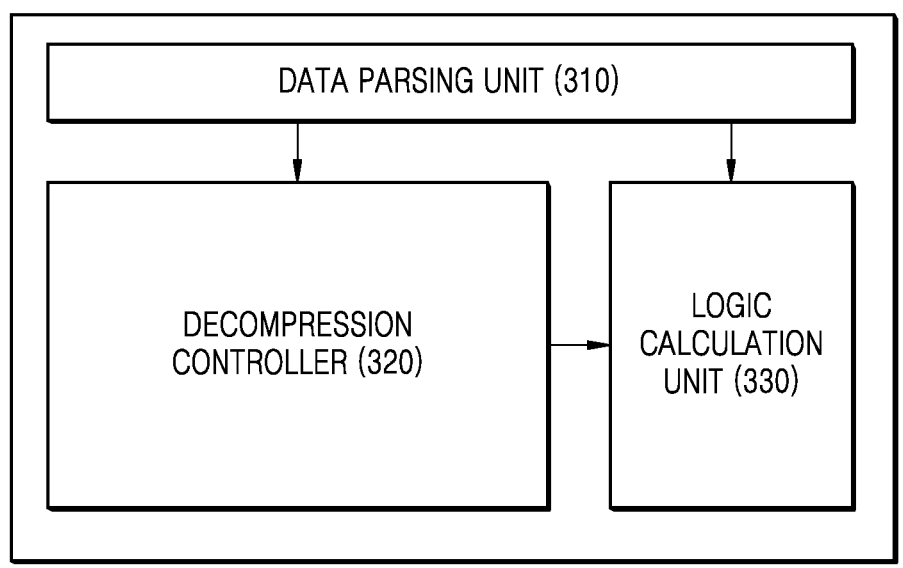
FIG. 3 is a block diagram of a decompression apparatus, according to an embodiment.

FIG. 3 is a block diagram of the decompression apparatus 210, according to an embodiment.

Referring to FIG. 3, the decompression apparatus 210 includes a data parsing unit 310, a decompression controller 320, and a logic calculation unit 330. The decompression apparatus 210 of FIG. 3 may also include additional structural elements. Therefore, universal elements other than the elements shown in FIG. 3 may be further included in the decompression apparatus 210.

The data parsing unit 310 acquires the control component and the texture component from the compressed input data, including rendering information, of an object. The control component includes information about the compression format. For example, the control component includes information about a particular kind or kinds of the compression formats, information about partitions, information about a pixel index mask, and information about color index.

The compression formats include a block compression (BC), an Ericsson texture compression (ETC), and ATSC. The information about the partition includes information about data processing units. For example, the information about partition includes information about how the data of 4×4 pixel unit is partitioned in a transverse axis or a longitudinal axis.

The information about the pixel index mask includes information about coordinates of pixels that are processed. The coordinates of the processed pixels are redesignated according to the information included in the pixel index mask. The color index information is index information corresponding to each of a plurality of colors. Color information included in the input data is determined according to the color index information.

In addition, the data parsing unit 310 transmits the control component and the texture component acquired from the compressed input data to the decompression controller 320 and the logic calculation unit 330.

The decompression controller 320 allocates the acquired control component to a control unit corresponding to the acquired control component. In an illustrative configuration, the decompression controller 320 is a single controller or control unit configured to perform the allocation. In an alternative configuration, the decompression controller 320 is fragmented into a plurality of control units to perform the allocation. For example, the decompression controller 320 allocates the acquired control component to one of the control units to process information of the compression format, according to the compression format of the control component. The control unit to which the control component is allocated extracts a control command from the control component.

The plurality of control units included in the decompression controller 320 will be described with reference to FIG. 6.

Figure 6:
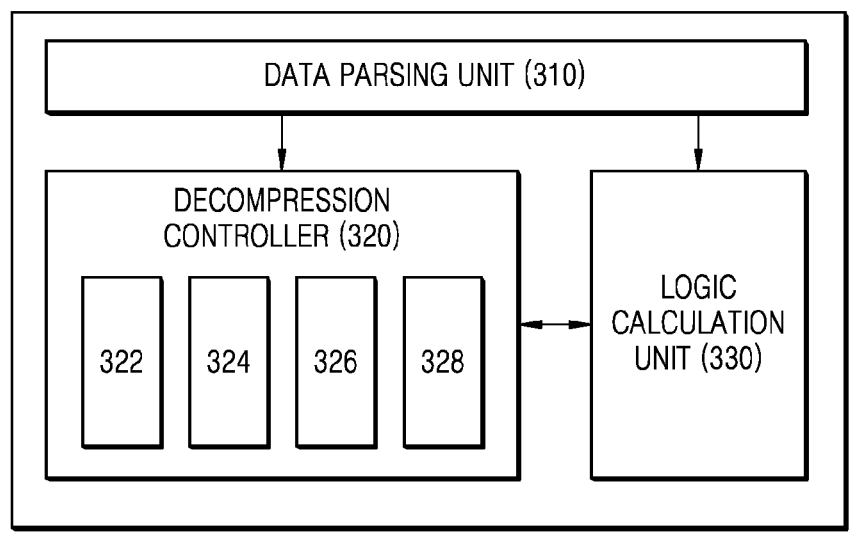
FIG. 6 is a block diagram of a decompression apparatus including a decompression control unit having control units, according to an embodiment.

FIG. 6 is a block diagram of the compression device 210 including the decompression controller 320 including a plurality of control units 322, 324, 326, and 328, according to an embodiment. The data parsing unit 310, the decompression controller 320, and the logic calculation unit 330 included in the decompression apparatus 210 of FIG. 6 operate in the same way as those of FIG. 3.

The decompression controller 320 includes the plurality of control units 322, 324, 326, and 328. The configuration of the plurality of control units 322, 324, 326, and 328 may differ from each other in order to be able to process a particular kind of compression format. For example, the decompression controller 320 may include at least one control unit 322 configured to process the control component of the input data compressed in the BC type, at least one control unit 326 configured to process the control component of the input data compressed in the ETC type, and at least one control unit 328 configured to process the control component of the input data compressed in the ATSC type.

Also, if the decompression controller 320 includes the plurality of control units 322, 324, 326, and 328, which differ according to the compression formats, identifiers may be used to identify each of the plurality of control units 322 and 324 that process the control component of the same compression format. For example, if a first control unit 322 and a second control unit 324 both process the control component of the input data compressed in the BC type, the first and second control units 322 and 324 are identified by using identifiers. The data parsing unit 310 transmits the control component to the decompression controller 320 after designating the identifier.

Based on the acquired control component, the decompression controller 320 transmits a control command for controlling the calculation performed based on the texture component in the logic calculation unit 330 to the logic calculation unit 330. Also, the decompression controller 320 communicates with the logic calculation unit 330 to transmit control commands that are necessary during the calculation performed in the logic calculation unit 330 to the logic calculation unit 330.

The logic calculation unit 330 acquires the texture component from the data parsing unit 310. Also, based on the control commands transmitted from the decompression controller 320, the logic calculation unit 330 restores the texture data of the object from the acquired texture component.

Also, in one illustrative configuration, the logic calculation unit 330 includes a plurality of calculation units. The logic calculation unit 330 performs or executes at least one logic operation or arithmetic operation to acquire the texture data from the acquired texture component. The calculation units, according to an embodiment, perform calculations such as adding and multiplying. The logic calculation unit 330 performs calculation with respect to the input data compressed in the BC type by using the calculation units, based on minimum color 0 and maximum color 1, to acquire information about other colors.

Also, in an alternative configuration, the logic calculation unit 330 acquires texture data from the input data compressed in the ETC type or the ATSC type by using the calculation units.

Figure 4:
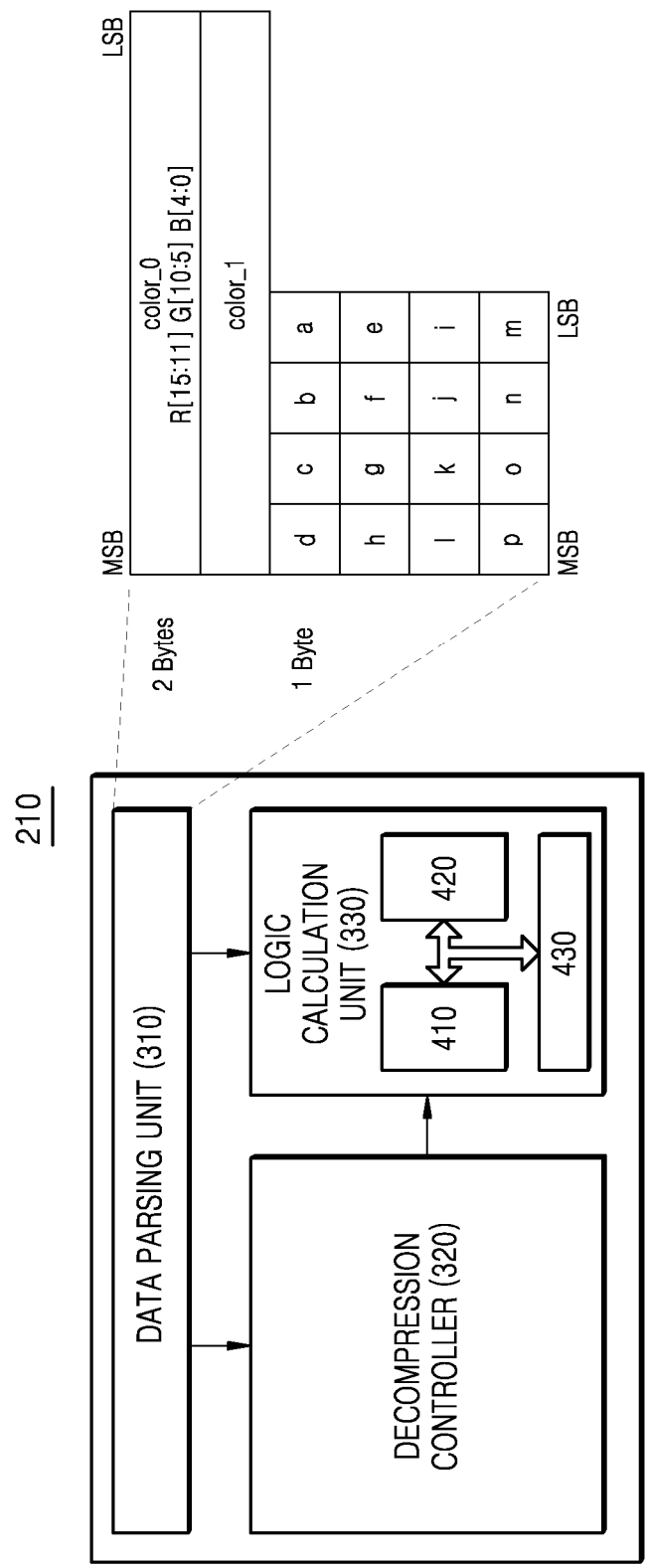
FIG. 4 is a diagram illustrating a method of parsing and allocating input data compressed in a block compression (BC) format by the decompression apparatus, according to an embodiment.

FIG. 4 is a diagram illustrating a method of parsing and allocating the input data compressed in the BC format by using the decompression apparatus 210, according to the present exemplary embodiment.

Referring to FIG. 4, the data parsing unit 310 of the decompression apparatus 210 parses the input data compressed in the BC format to allocate the control component to the decompression controller 320 and to allocate the texture component to the logic calculation unit 330. According to an embodiment, the logic calculation unit 330 includes two multiply units 410 and 420 and one addition unit 430. The logic calculation unit 330 multiplies the minimum color 0, included in the texture component, by a predetermined first value, and multiplies the maximum color 1, also included in the texture component, by a predetermined second value to restore a first intermediate color. Also, the logic calculation unit 330 multiplies the minimum color 0 included in the texture component by the predetermined second value and multiplies the maximum color 1 by the predetermined first value to restore a second intermediate color.

In addition, the control commands needed for the logic calculation unit 330 to perform the above color restoration operation are transmitted from the decompression controller 320. The decompression controller 320 provides the logic calculation unit 330 with information about a unit and an order of the input data to be processed, during a process of restoring the texture data based on the texture component acquired by the logic calculation unit 330.

Figure 5:
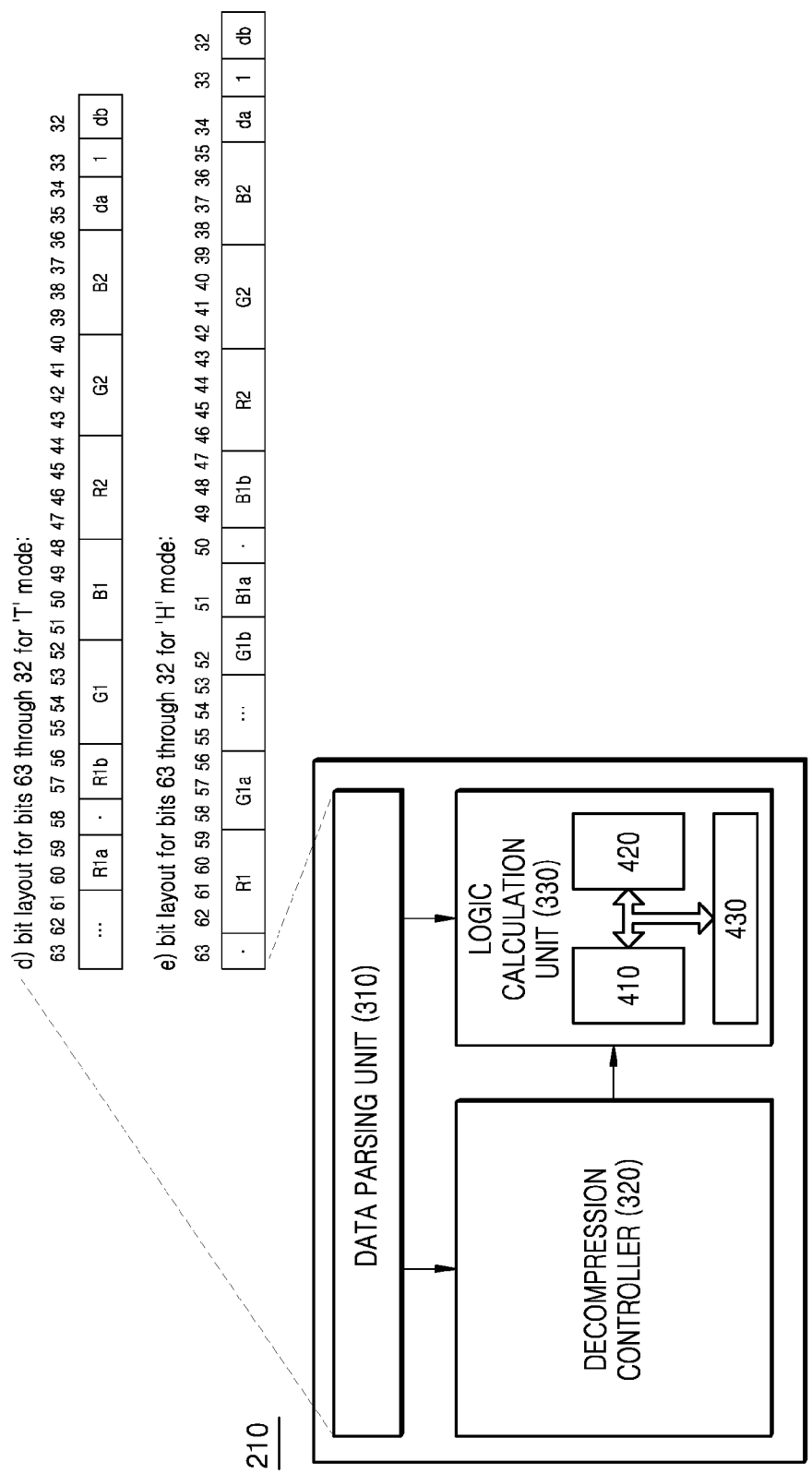
FIG. 5 is a diagram illustrating a method of parsing and allocating input data compressed in an Ericsson texture compression (ETC) format by the decompression apparatus, according to an embodiment.

FIG. 5 is a diagram illustrating a method of parsing and allocating input data compressed in the ETC format by using the decompression apparatus 210, according to an embodiment.

Referring to FIG. 5, the data parsing unit 310 of the decompression apparatus 210 parses the input data compressed in the ETC format to allocate the control component to the decompression controller 320 and to allocate the texture component to the logic calculation unit 330. As described above with reference to FIG. 4, the logic calculation unit 330, including the two multiply units 410 and 420 and one addition unit 430, restores the texture data from the texture component with respect to the input data compressed in the ETC format.

The logic calculation 330, based on a basic color 1 and a basic color 2, restores information about other colors by using distance information. For example, the logic calculation unit 330 adds a predetermined distance to the basic color 2 to restore another first color. In addition, the logic calculation unit 330 subtracts the predetermined distance from the basic color 2 to restore another second color.

In addition, control commands needed for the logic calculation unit 330 to perform the color restoration operation are transmitted from the decompression controller 320. The decompression controller 320 provides the logic calculation unit 330 with information about unit and order of the input data to be processed during a process of restoring the texture data from the texture component acquired by the logic calculation unit 330.

Figure 7:
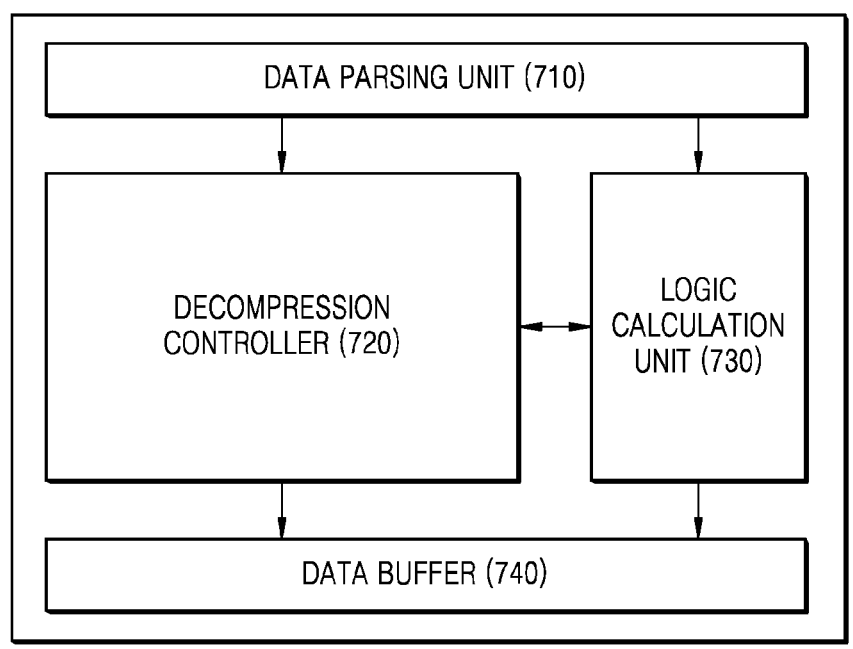
FIG. 7 is a diagram of a decompression apparatus, according to another embodiment.

FIG. 7 is a diagram of a decompression apparatus 700, according to another embodiment.

Referring to FIG. 7, the decompression apparatus 700 includes a data parsing unit 710, a decompression controller 720, a logic calculation unit 730, and a data buffer 740. The structural elements included in FIG. 7 for the decompression apparatus 700 are for illustrative purposes. A person of ordinary skill in the relevant art will appreciate that additional structural elements may be also included in the decompression apparatus 700. Furthermore, in an alternative configuration, the data parsing unit 710 and the data buffer 740 may be external to the decompression apparatus 700.

The data parsing unit 170 acquires a control component and a texture component from compressed input data including rendering information of an object. The data parsing unit 710 may correspond to the data parsing unit 310 described above with reference to FIG. 3.

The decompression controller 720 includes a control unit or a plurality of control units. The decompression controller 720 allocates the control component to a control unit corresponding to the acquired control component. The control unit to which the control component is allocated extracts a control command from the control component.

Also, the decompression controller 720 compares the control component to a previous control component so as to control a calculation performed in the logic calculation unit 730 and restore texture data based on the texture component. This will be described later when the data buffer 740 is described.

The logic calculation unit 730 acquires the texture component from the data parsing unit 710. Also, based on the control command transmitted from the decompression controller 720, the logic calculation unit 730 restores the texture data of the object from the acquired texture component.

The data buffer 740 receives the control component from the decompression controller 720, and receives the texture data from the logic calculation unit 730. The data buffer 740 may store the control component and the texture data. Also, the data buffer 740 outputs the control component and the texture data to the texture rendering unit 220.

In addition, the decompression controller 720, according to an embodiment, performs the restoration of the texture data from the compressed input data effectively by using the control component and the texture data stored in the data buffer 740.

The decompression controller 720 compares a first control component previously transmitted from the data parsing unit 710 with a second control component that is currently transmitted from the data parsing unit 710. Hereinafter, the control component and the texture component that are parsed from first compressed input data previously acquired will be referred to as first control component and first texture component, respectively. Also, the control component and the texture component parsed from second compressed input data that is currently acquired will be referred to as second control component and second texture component, respectively.

As a result of comparing the first control component with the second control component, if the first control component and the second control component are the same as each other, the decompression controller 720 does not transmit a control command that is necessary to restore the texture data from the second texture component to the logic calculation unit 730. The decompression controller 720 selects the texture data acquired from the first texture component by using the first control component previously stored in the data buffer 740. The decompression controller 720 outputs the first texture data that is previously stored as the texture data restored from the second compressed input data. If the second control component is the same as the first control component, the decompression controller 720 uses the texture data that is previously stored in the data buffer 740. As a result, the resource that is consumed to restore the texture data by using the logic calculation unit 730 is reduced.

If the first control component and the second control component are different from each other, the decompression controller 720 acquires the second texture data from the second texture component based on the control command extracted from the second control component, as described above with reference to FIG. 3. The decompression controller 720 may store the second texture data in the data buffer 740.

In addition, according to another embodiment, the decompression controller 720 performs the restoration of the texture data from the compressed input data more effectively by respectively comparing the control component and the texture component with the previous control component and the previous texture component.

If the first control component is the same as the second control component and the first texture component is the same the second texture component, the decompression controller 720 does not transmit to the logic calculation unit 730 a control command to restore the texture data from the second texture component. The decompression controller 720 selects the texture data acquired from the first texture component by using the first control component that is previously stored in the data buffer 740. Also, the decompression controller 720 outputs the first texture data that is previously stored as the texture data restored from the second input data.

If the first control component and the second control component are different from each other or the first texture component and the second texture component are different from each other, the decompression controller 720 acquires the second texture data from the second texture component, based on the control command extracted from the second control component as described above with reference to FIG. 3. The decompression controller 720 stores the second texture data in the data buffer 740.

Figure 8:
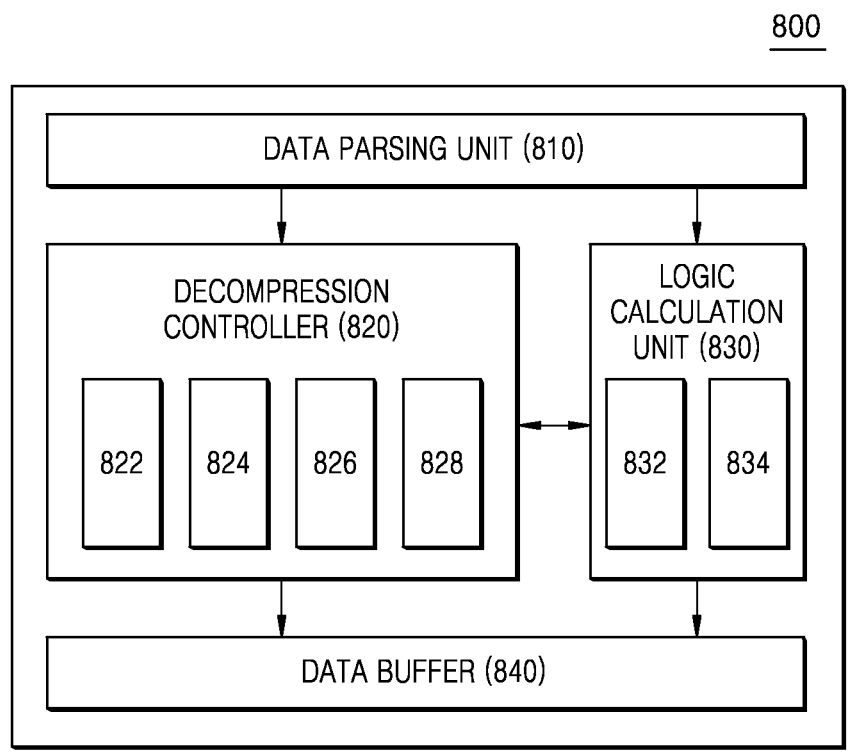
FIG. 8 is a block diagram of a decompression apparatus, according to another embodiment.

FIG. 8 is a block diagram of a decompression controller 800, according to another embodiment.

Referring to FIG. 8, the decompression controller 800 includes a data parsing unit 810, a decompression controller 820, a logic calculation unit 830, and a data buffer 840. For illustrative purposes, the decompression apparatus 800 of FIG. 8 shows structural elements associated with the embodiment. Additional structural elements and universal elements other than the elements shown in FIG. 8 may be further included in the decompression apparatus 800.

The data parsing unit 810 acquires the control component and the texture component from compressed input data including rendering information of an object. The data parsing unit 810 may correspond to the data parsing unit 310 described above with reference to FIG. 3.

In addition, the data parsing unit 810 acquires a plurality of control components and a plurality of texture components from the compressed input data. For example, if the compressed input data has a size of 2M bytes, two control components each having a size of A bytes [a2] and a texture component having a size of 2B bytes may be acquired from the compressed input data.

The decompression controller 820 includes a plurality of control units 822, 824, 826, and 828, and the acquired control component is allocated to the control unit corresponding to the acquired control component. The control unit to which the control component is allocated extracts a control command from the control component. The decompression controller 820 transmits the extracted control command to the logic calculation unit 830.

In addition, the decompression controller 820 acquires a plurality of control components. For example, the decompression controller 820 may acquire two control components each having a size of A bytes. The decompression controller 820 allocates the control components, respectively, to a first control unit 822 and a second control unit 824 corresponding to the acquired control components. The first and second control units 822 and 824 process the control components allocated thereto in parallel.

The logic calculation unit 830 acquires the texture component from the data parsing unit 810. The logic calculation unit 830 restores the texture data of the object from the acquired texture component, based on the control command transmitted from the decompression controller 820.

The logic calculation unit 830 includes a plurality of calculation units 832 and 834. The plurality of calculation units 832 and 834 may be classified according to kinds of calculations that are frequently performed. For example, the first calculation unit 832 includes operators that perform the calculations executed a predetermined number of times or greater. The second calculation unit 834 includes operators that perform the calculations executed less than the predetermined number of times. The logic calculation unit 830, according to the exemplary embodiment, extracts the operators that are frequently used and allocates the operators to the first calculation unit 832, and allocates the other operators to the second calculation unit 834 in order to reduce a size of a memory of the first calculation unit 832. Accordingly, when a command is transmitted between the decompression controller 820 and the first calculation unit 832, the resources may be effectively used.

The data buffer 840 receives the control component from the decompression controller 820, and receives the texture data from the logic calculation unit 830. The data buffer 840 stores the control component and the texture data. Also, the data buffer 840 outputs the control component and the texture data to the texture rendering unit 220.

Figure 9:
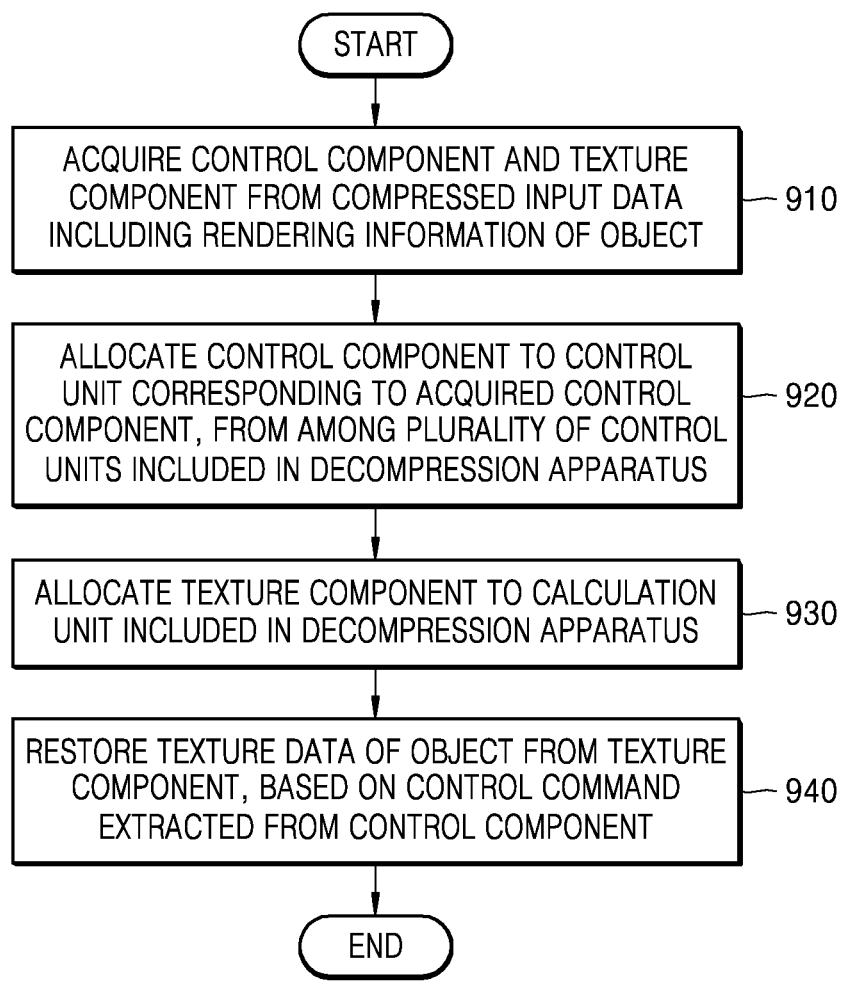
FIG. 9 is a flowchart illustrating a method of decompressing rendering data by a decompression apparatus, according to an embodiment.

FIG. 9 is a flowchart illustrating a method of decompressing rendering data by using the decompression apparatus 210, according to an embodiment.

In operation S910, the method, through the decompression apparatus 210, acquires the control component and the texture component from the compressed input data including rendering information of an object. The control component includes information about the compression format. For example, the control component includes information about the kind of the compression format, information about partition, information about pixel index mask, color index information, and information about output latency.

In operation S920, from among the plurality of control units 322, 324, 326, and 328 included in the decompression apparatus 210, the method allocates the acquired control component to the control unit corresponding to the acquired control component. The information included in the control component may vary depending on the compression format used to compress the texture data. The control unit, to which the control component is allocated, extracts the control command from the control component. The plurality of control units 322, 324, 326, and 328 may differ from each other according to the kinds of the compression formats.

Also, if the decompression apparatus 210 includes a plurality of control units 322, 324, 326, and 328 for each of the compression formats, the decompression apparatus 210 identifies the plurality of control units (for example, 322 and 324) processing the control components of the same compression format by using the identifiers. When the decompression apparatus 210 transmits the control component to the decompression controller 320, the decompression apparatus 210 designates a certain identifier.

In operation S930, the method allocates the texture component to the logic calculation unit 330 included in the decompression apparatus 210. The texture component includes information about logic calculation that has to be performed in order to acquire the texture data from the compressed input data. The texture component includes information about operators used in the logic calculations that are commonly necessary by the various compression formats and calculation data.

In operation S940, the method restores the texture data of the object from the texture component, based on the control command extracted from the control component. The method, through the decompression apparatus 210, acquires the control commands that are necessary to perform the restoration of the texture data from the control component. The decompression apparatus 210 acquires information about the unit and order of the input data to be processed from the control component, during the process of restoring the texture data.

Figure 10:
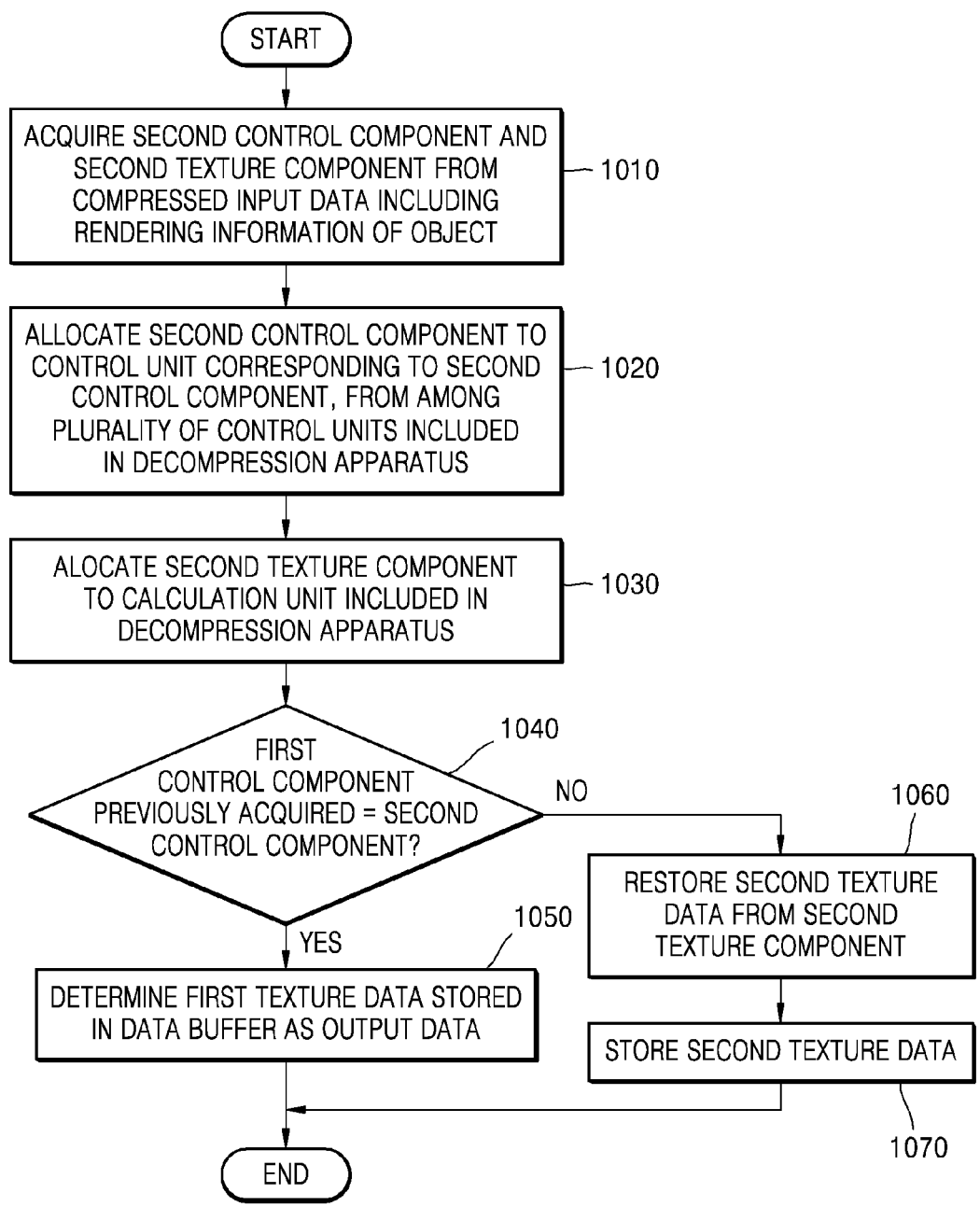
FIG. 10 is a flowchart illustrating a method of decompressing rendering data by a decompression apparatus, according to another embodiment.

FIG. 10 is a flowchart illustrating a method of decompressing rendering data by using the decompression apparatus 210, according to another embodiment.

In operation S1010, the method, through the decompression apparatus 210, acquires the second control component and the second texture component from the compressed input data including the rendering operation of the object. The second control component may include information about the compression format.

In addition, operation S1010 may correspond to operation S910 of FIG. 9.

In operation S1020, the method allocates the second control component to the control unit corresponding to the second control component, from among the plurality of control units 322, 324, 326, and 328 included in the decompression apparatus 210.

Operation S1020 may correspond to operation S920 of FIG. 9.

In operation S1030, the method allocates the second texture component to the logic calculation unit 330 included in the decompression apparatus 210.

Operation S1030 may correspond to operation S930 of FIG. 9.

In operation S1040, the method compares the first control component with the second control component.

In operation S1050, if the first control component and the second control component are the same as each other, the method determines the first texture data that is previously stored as the output data. If the first control component and the second control component are the same as each other, the method does not restore the texture data from the second texture component, but uses the first texture data that is previously stored as restoration data of the compressed input data.

In operation S1060, the method restores second texture data from the second texture component, based on the control command extracted from the second control component.

Operation S1060 may correspond to operation S940 of FIG. 9.

In operation S1070, the method stores the second texture data.

Figure 11:
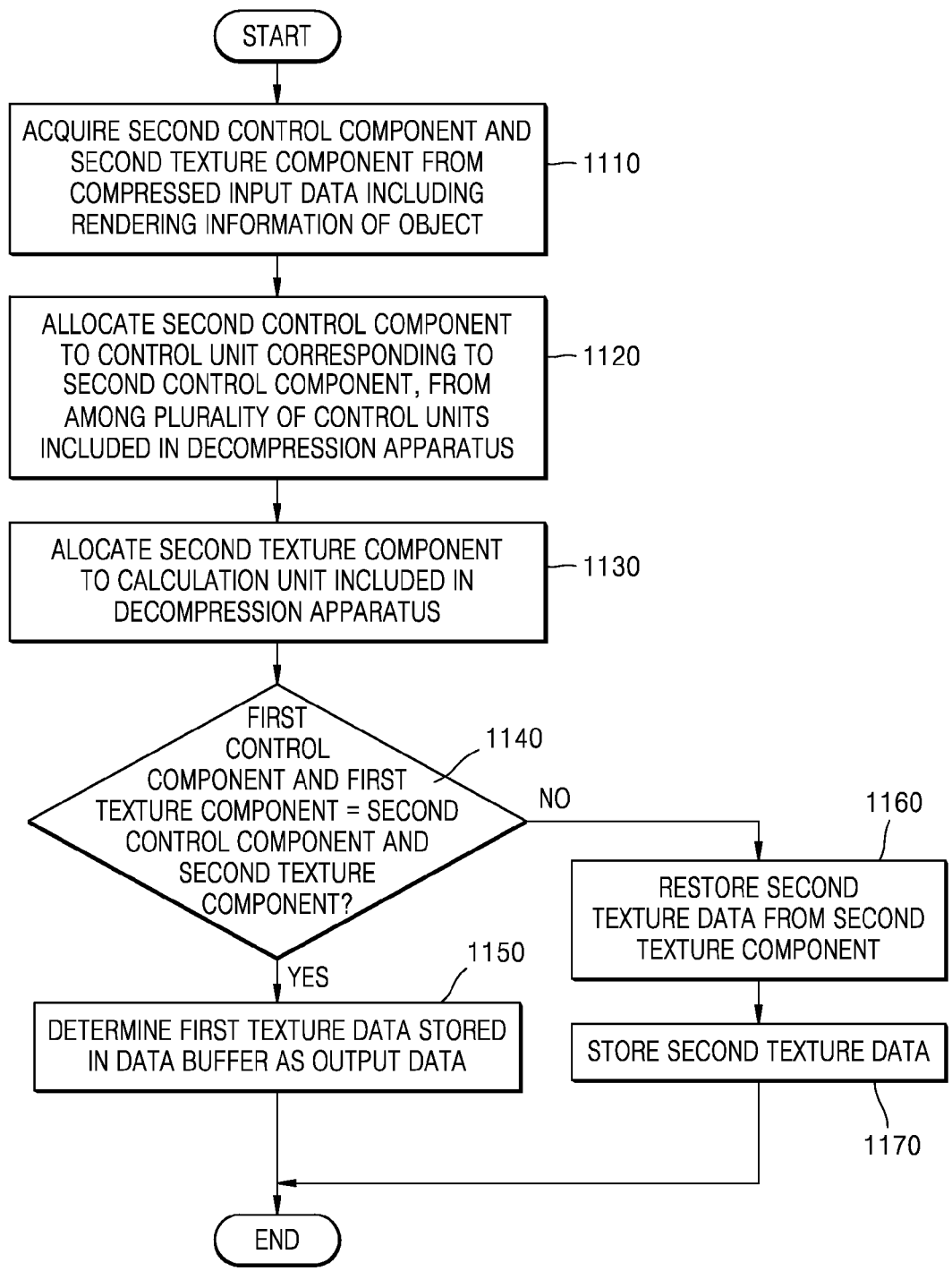
FIG. 11 is a flowchart illustrating a method of decompressing rendering data by a decompression apparatus, according to another embodiment.

FIG. 11 is a flowchart illustrating a method of decompressing rendering data by using the decompression apparatus 210, according to another embodiment.

In operation S1110, the method, through the decompression apparatus 210, acquires the second control component and the second texture component from the compressed input data including rendering data of an object. The second control component may further include information about the compression format.

Operation S1110 may correspond to operation S910 of FIG. 9.

In operation S1120, the method allocates the second control component to the control unit corresponding to the second control component, from among the plurality of control units 322, 324, 326, and 328 included in the decompression apparatus 210.

Operation S1120 may correspond to operation S920 of FIG. 9.

In operation S1130, the method allocates the second texture component to the logic calculation unit 330 included in the decompression apparatus 210.

Operation S1130 may correspond to operation S930 of FIG. 9.

In operation S1140, the method compares the first control component and the first texture component that are previously acquired with the second control component and the second texture component, respectively.

In operation S1150, if the first control component and the second control component are the same as each other and the first texture component and the second texture component are the same as each other, the method determines the first texture data that is previously stored as output data. If the first control component and the second control component are the same as each other and the first texture component and the second texture component are the same as each other, the decompression apparatus 210 does not restore the texture data from the second texture component, but uses the first texture data stored previously as restoration data of the compressed input data.

In operation S1160, based on the control command extracted from the second control component the method restores the second texture data from the second texture component.

Operation S1160 may correspond to operation S940 of FIG. 9.

In operation S1170, the method stores the second texture data.

The device, memory, interfaces, and units described herein may include a processor, a memory for storing program data and executing it, a permanent storage unit such as a disk drive, a communications port for handling communications with external devices, and user interface devices, including a touch panel, keys, buttons, etc. When software modules or algorithms are involved, these software modules may be stored as program instructions or computer readable codes executable on a processor on a computer-readable medium. Examples of the computer readable recording medium include magnetic storage media (e.g., ROM, floppy disks, hard disks, etc.), and optical recording media (e.g., CD-ROMs, or DVDs). The computer readable recording medium can also be distributed over network coupled computer systems so that the computer readable code is stored and executed in a distributive manner. This media can be read by the computer, stored in the memory, and executed by the processor.

For the purposes of promoting understanding of the principles of the inventive concept, reference has been made to the preferred embodiments in the drawings, and specific language has been used to describe these embodiments. However, no limitation of the scope of the inventive concept is intended by this specific language, and the inventive concept should be construed to encompass all embodiments that would normally occur to one of ordinary skill in the art.

It is to be understood that in the embodiment of the present invention, the operations in FIGS. 9-11 are performed in the sequence and manner as shown although the order of some operations and the like may be changed without departing from the spirit and scope of the described configurations. In accordance with an illustrative example, a computer program embodied on a non-transitory computer-readable medium may also be provided, encoding instructions to perform at least the method described in FIGS. 9-11.

Program instructions to perform a method described in FIGS. 9-11, or one or more operations thereof, may be recorded, stored, or fixed in one or more non-transitory computer-readable storage media. The program instructions may be implemented by a computer. For example, the computer may cause a processor to execute the program instructions. The media may include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable recording mediums. Also, functional programs, codes, and code segments for accomplishing the example embodiments disclosed herein may be easily construed by programmers skilled in the art to which the embodiments pertain based on and using the flow diagrams and block diagrams of the figures and their corresponding descriptions as provided herein.

The particular implementations shown and described herein are illustrative examples of the inventive concept and are not intended to otherwise limit the scope of the invention in any way. For the sake of brevity, conventional electronics, control systems, software development and other functional aspects of the systems may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the inventive concept unless the element is specifically described as "essential" or "critical".

It should be understood that the exemplary embodiments described therein should be considered in a descriptive sense only and not for purposes of limitation. Descriptions of features or aspects within each exemplary embodiment should typically be considered as available for other similar features or aspects in other exemplary embodiments.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A decompression apparatus for decompressing rendering data, comprising:
a processor configured to:
acquire a control component including information about compression format and a texture component from compressed input data including rendering information of an object;
compare previously acquired first control component and first texture component with currently acquired second control component and second texture component;
allocate the second control component to a controller included in the processor and the second texture component to a logic calculator included in the processor based on a result of the comparison, wherein the controller extracts a control command from the second control component; and
control the logic calculator to restore texture data of the object from the second texture component based on the control command,
wherein the logic calculator restores differing texture data of different compression formats using a same calculator, and
wherein the controller includes a plurality of control units for the different compression formats.

2. The decompression apparatus of claim 1, wherein the plurality of control units are each configured to:
process a compression format of the compressed input data; and
wherein the controller is further configured to: allocate the control component to a control unit of the control units corresponding to the compression format of the compressed input data.

3. The decompression apparatus of claim 2, wherein:
the plurality of control units of a same type are identified according to identifiers; and
the processor is further configured to determine a type and an identifier of the control unit to which the control component is allocated.

4. The decompression apparatus of claim 1, further comprising:
a data buffer configured to store the control component and the texture data.

5. The decompression apparatus of claim 4, wherein
in response to the first control component and the first texture component being different from the second control component and the second texture component, respectively, the processor is further configured to determine second texture data that is restored from the second control component as output data, and
in response to the first control component and the first texture component being the same as the second control component and the second texture component, respectively, the processor is further configured to determine first texture data restored from the first texture component as output data.

6. The decompression apparatus of claim 1, wherein
the processor is further configured to compare the previously acquired first control component with the currently acquired second control component,
in response to the first control component and the second control component being different from each other, the processor is further configured to restore second texture data from a second texture component corresponding to the second control component according to the control command extracted from the second control component, and
in response to the first control component and the second control component being the same as each other, the processor is further configured to select first texture data corresponding to the first control component.

7. The decompression apparatus of claim 1, wherein the processor is further configured to acquire control components and texture components, to allocate the control components to the control units respectively corresponding to the control components and to transmit control commands acquired from the control units to the logic calculator included in the processor.

8. A method of decompressing rendering data, comprising:
acquiring a control component including information about compression format and a texture component from compressed input data including rendering information of an object at a decompression apparatus;
comparing previously acquired first control component and first texture component with currently acquired second control component and second texture component;
allocating the second control component to a controller included in the decompression apparatus and the second texture component to a logic calculator included in the decompression apparatus based on a result of the comparing;
controlling the controller to extract a control command from the second control component and the logic calculator to restore texture data of the object from the second texture component based on the control command; and
wherein the logic calculator restores differing texture data of different compression formats using a same calculator, and
wherein the controller includes a plurality of control units for the different compression formats.

9. The method of claim 8, wherein the allocating of the control component comprises allocating the control component to the plurality of control units corresponding to a compression format of the compressed input data, from among the control units, each configured to process a compression format of the compressed input data.

10. The method of claim 9, wherein the allocating of the control component comprises determining a type and an identifier of a control unit, and further comprising:
identifying control units of a same type using identifiers.

11. The method of claim 8, further comprising storing the control component and the texture data in a data buffer.

12. The method of claim 11, further comprising:
in response to the first control component and the first texture component being different from the second control component and the second texture component, respectively, determining second texture data restored from the second control component as output data; and
in response to the first control component and the first texture component being the same as the second control component and the second texture component, respectively, determining first texture data restored from the first texture component as output data.

13. The method of claim 8, further comprising:
comparing the first control component with the second control component;
in response to the first control component and the second control component being different from each other, restoring second texture data from the second texture component corresponding to the second control component according to the control command extracted from the second control component; and
in response to the first control component and the second control component being the same as each other, selecting the first texture data corresponding to the first control component that is previously stored.

14. The method of claim 8, wherein the acquiring of the control component and the texture component comprises acquiring control components and texture components, and the allocating of the control component comprises:
allocating the control components to the control units included in the decompression apparatus respectively corresponding to the control components; and
transmitting control commands acquired from the control units to the logic calculator included in the decompression apparatus.

15. A computer program embodied on a non-transitory computer readable medium, the computer program being configured to control a processor to perform the method of claim 8.

* * * * *